United States Patent
Eser et al.

(10) Patent No.: US 10,287,998 B2
(45) Date of Patent: May 14, 2019

(54) METHODS FOR CHECKING THE PLAUSIBILITY OF A CYLINDER PRESSURE SENSOR

(71) Applicant: Continental Automotive GmbH, Hannover (DE)

(72) Inventors: Gerhard Eser, Hemau (DE); Dirk Heinitz, Undorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 160 days.

(21) Appl. No.: 15/347,418

(22) Filed: Nov. 9, 2016

(65) Prior Publication Data

US 2017/0058802 A1 Mar. 2, 2017

Related U.S. Application Data

(62) Division of application No. 14/409,602, filed as application No. PCT/EP2013/062296 on Jun. 13, 2013.

(30) Foreign Application Priority Data

Jun. 19, 2012 (DE) .......................... 10 2012 210 301

(51) Int. Cl.
*F02D 35/02* (2006.01)
*F02D 41/00* (2006.01)
(Continued)

(52) U.S. Cl.
CPC ....... *F02D 41/0085* (2013.01); *F02D 35/023* (2013.01); *F02D 41/009* (2013.01);
(Continued)

(58) Field of Classification Search
CPC ..... F02D 2200/1012; F02D 2200/1004; F02D 35/023–35/024; F02D 41/009;
(Continued)

(56) References Cited

U.S. PATENT DOCUMENTS

| 5,789,658 A | 8/1998 | Henn et al. ..................... 73/1.37 |
| 6,302,083 B1 | 10/2001 | Karcher et al. ............... 123/305 |

(Continued)

FOREIGN PATENT DOCUMENTS

| CN | 101713344 A | 5/2010 | ............. F02M 41/22 |
| CN | 102124316 A | 7/2011 | ............... G01L 3/16 |

(Continued)

OTHER PUBLICATIONS

International Search Report and Written Opinion, Application No. PCT/EP2013/062296, 15 pages, dated Oct. 28, 2013.

(Continued)

*Primary Examiner* — Daniel S Larkin
*Assistant Examiner* — David L Singer
(74) *Attorney, Agent, or Firm* — Slayden Grubert Beard PLLC

(57) ABSTRACT

A method for determining an amount of energy released in the working cycle of an internal combustion engine cylinder includes: (a) recording a time curve of the rotational speed of the engine crankshaft using tooth timings measured using a toothed sensor disc, (b) assigning each tooth timing to a working cycle of a selected cylinder, (c) determining a cylinder-specific average value from the tooth timings assigned to the selected cylinder, (d) determining cylinder-specific tooth timing deviations from the determined cylinder-specific average value, for the tooth timings assigned to each working cycle of the selected cylinder, (e) determining a cylinder-specific characteristic tooth timing by summing the determined tooth timing deviations, and (f) specifying the amount of energy released in the working cycle of the selected cylinder as a function of the determined cylinder-specific characteristic tooth timing, the amount of energy released being indirectly proportional to the determined cylinder-specific characteristic tooth timing.

2 Claims, 4 Drawing Sheets

(51) Int. Cl.
*F02D 41/14* (2006.01)
*F02D 41/24* (2006.01)
*F02D 41/26* (2006.01)
*F02D 41/30* (2006.01)
*G01M 15/08* (2006.01)

(52) U.S. Cl.
CPC ..... *F02D 41/0097* (2013.01); *F02D 41/1498* (2013.01); *F02D 41/2474* (2013.01); *F02D 41/26* (2013.01); *F02D 41/3005* (2013.01); *G01M 15/08* (2013.01); *F02D 2200/1012* (2013.01)

(58) Field of Classification Search
CPC ............ F02D 41/0085; F02D 41/1498; F02D 41/2474; F02D 41/0097; F02D 41/26; F02D 41/3005; G01M 15/06; G01M 15/08
USPC ..... 73/114.16, 114.15, 114.26; 123/435–436
See application file for complete search history.

(56) References Cited

U.S. PATENT DOCUMENTS

| | | | |
|---|---|---|---|
| 7,415,351 B2 | 8/2008 | Raichle et al. | 701/114 |
| 8,577,645 B2 | 11/2013 | Turin et al. | 702/183 |
| 8,695,408 B2 | 4/2014 | Fuchino | 73/114.15 |
| 2005/0056255 A1 | 3/2005 | Harris et al. | 123/435 |
| 2006/0259229 A1* | 11/2006 | Raichle | F02D 35/023 |
| | | | 701/114 |
| 2008/0236264 A1* | 10/2008 | Sato | F02D 35/023 |
| | | | 73/114.18 |
| 2009/0259382 A1 | 10/2009 | Mckay et al. | 701/102 |
| 2009/0276143 A1 | 11/2009 | Rackmil et al. | 701/103 |
| 2009/0312941 A1* | 12/2009 | Wang | F02D 35/023 |
| | | | 701/114 |
| 2011/0160983 A1 | 6/2011 | De Fazio et al. | 701/103 |
| 2013/0206108 A1* | 8/2013 | Schule | F02D 13/0226 |
| | | | 123/435 |

FOREIGN PATENT DOCUMENTS

| | | | |
|---|---|---|---|
| CN | 102137996 A | 7/2011 | ............ F02D 41/14 |
| DE | 19700711 A1 | 9/1998 | ............ F02D 41/00 |
| DE | 19720009 A1 | 11/1998 | ............ F02D 41/00 |
| DE | 19814155 A1 | 10/1999 | ............ F02D 41/14 |
| DE | 102004062017 A1 | 7/2006 | ............ F02D 41/00 |
| DE | 102005047829 B3 | 5/2007 | ............ F02D 41/00 |
| DE | 102008001373 A1 | 10/2009 | ............ F02D 41/00 |
| EP | 1723331 B1 | 2/2010 | ............ F02D 41/34 |
| WO | 01/77692 A2 | 10/2001 | ............ F02D 41/34 |
| WO | 2013/189839 A1 | 12/2013 | ............ F02D 35/02 |

OTHER PUBLICATIONS

Chinese Office Action, Application No. 201380032807.7, 6 pages, dated Jun. 30, 2016.
U.S. Final Office Action, U.S. Appl. No. 14/409,602, 15 pages, dated Mar. 2, 2017.
U.S. Non-Final Office Action, U.S. Appl. No. 14/409,602, 28 pages, dated Jun. 29, 2018.
U.S. Non-Final Office Action, U.S. Appl. No. 14/409,602, 21 pages, dated Dec. 15, 2016.
Kiencke, Uwe et al., "Automotive Control Systems for Engine, Driveline, and Vehicle," 2nd Edition, Springer, 521 Pages, dated 2005.
Östman, F. et al., "Model-Based Torsinal Vibration Control of Internal Combustion Engines," IET Control Theory and Applications, vol. 2, No. 11, pp. 1024-1032, dated Jun. 11, 2008.
Östman, Fredrik et al., "Adaptive Cylinder Balancing of Internal Combustion Engines," IEEE Transactions on Control Systems Technology, vol. 19, No. 4, pp. 782-791, dated Jun. 17, 2011.
U.S. Final Office Action, U.S. Appl. No. 14/409,602, 19 pages, dated Oct. 5, 2018.

* cited by examiner

METHODS FOR CHECKING THE PLAUSIBILITY OF A CYLINDER PRESSURE SENSOR

CROSS-REFERENCE TO RELATED APPLICATIONS

This application is a Divisional of U.S. patent application Ser. No. 14/409,602 filed Dec. 19, 2014, which is a U.S. National Stage Application of International Application No. PCT/EP2013/062296 filed Jun. 13, 2013, which designates the United States of America, and claims priority to DE Application No. 10 2012 210 301.5 filed Jun. 19, 2012, the contents of which are hereby incorporated by reference in their entirety.

TECHNICAL FIELD

The present invention generally relates to the technical field of the operation of internal combustion engines in a motor vehicle. The present invention especially relates to (a) a method for determining the amount of energy released in the working stroke of a cylinder of an internal combustion engine. The present invention further relates to (b) a method for the regulation of the smooth running of an internal combustion engine, (c) a method for determining the cylinder pressure in different cylinders of an internal combustion engine with at least two cylinders, wherein one cylinder is a lead cylinder fitted with a cylinder pressure sensor and the at least one other cylinder is an auxiliary cylinder, and (d) a method for checking the plausibility of a measurement signal of a cylinder pressure sensor of an internal combustion engine comprising at least two cylinders, each fitted with a cylinder pressure sensor. Moreover, the present invention relates to (e) a device for determining the amount of energy released in the working stroke of a cylinder of an internal combustion engine, (f) an engine controller with such a device and (g) a computer program that is configured to carry out one of the above-mentioned methods.

BACKGROUND

In internal combustion engine the masses of fuel that are injected per working cycle into the individual cylinders vary significantly because of manufacturing tolerances of a fuel injection system and by the occurrence of ageing of components of the fuel injection system. However, differences in the masses of the injected fuel result in torque differences between the individual cylinders that have an adverse effect on the smooth running of the internal combustion engine. Modern internal combustion engines, especially diesel engines, are therefore fitted with at least one so-called cylinder pressure sensor, which detects the time profile of the pressure in the interior of a cylinder. The torque provided by the cylinder involved can be estimated from the pressure profile and especially from the level of the pressure during the so-called working stroke in which the fuel combustion takes place. Based on a knowledge of such torque differences, balancing of the cylinders, i.e. equal torque contributions by all cylinders, can be achieved by means of an adjusted cylinder-specific fuel injection.

However, the output signal of a cylinder pressure sensor can be incorrect for many reasons. If such errors are not detected, this typically results in an incorrect cylinder-specific adjustment of the fuel injection. The smooth running of the internal combustion engine may not only not be improved but may even be significantly worsened.

A method for so-called cylinder balancing in relation to the injected masses of injected fuel in the different cylinders of an internal combustion engine is known From DE 197 20 009 A1. With this method the revolution rate or the rate of rotation during expansion and the revolution rate or the rate of rotation during compression is calculated for each cylinder. The difference in revolution rate between expansion and compression is filtered by means of a smoothing average value generation. Based on said filtered difference in revolution rates, an individual correction for the mass of fuel is calculated for each individual cylinder and said individual correction is taken into account during the calculation of the entire mass of fuel to be injected. The smooth running of the internal combustion engine can thus be improved by means of a mathematically relatively complex algorithm.

A method for compensating a systematic error in injection processes for an internal combustion engine is known from DE 197 00 711 A1. With this method, a correction value for the injection timing is used depending on the rough running.

A method and a system for cylinder balancing in reciprocating piston engines by compensating the harmonic components of the revolution rate of the crankshaft are known from DE 10 2005 047 829 B3. With this method a time interval of at least one revolution of the camshaft or two revolutions of the crankshaft is considered and within said time window a revolution rate signal of the crankshaft is subjected to a Fourier analysis.

The most frequent and fundamental cause of rough running of an internal combustion engine is, however, as explained above, a variation of the injected masses of fuel in the different cylinders. Assuming complete fuel combustion, different fuel-injected masses nevertheless result in different amounts of energy being released by fuel combustion in the working stroke of a cylinder of a four-stroke internal combustion engine.

SUMMARY

One embodiment provides a method for determining the amount of energy released in the working stroke of a cylinder of an internal combustion engine. The method includes the recording of a time profile of the revolution rate of the crankshaft of the internal combustion engine using toothing times, each representing a period of time within which two adjacent teeth of a sensor disk, which is connected to the crankshaft and which comprises an alternating arrangement of teeth and tooth spaces along its circumference, pass a reference position; associating the toothing times with a respective working cycle of a selected cylinder of the internal combustion engine; determining a cylinder-specific average value over the toothing times associated with the working cycle of the selected cylinder; determining cylinder-specific toothing time deviations of the toothing times associated with each working stroke of the selected cylinder from the determined cylinder-specific average value; determining a cylinder-specific characteristic toothing time by determining the geometric sum of the determined cylinder-specific toothing time deviations; and determining the amount of energy released in the working stroke of the selected cylinder of the internal combustion engine depending on the determined cylinder-specific characteristic toothing time, wherein the amount of energy released is indirectly proportional to the determined cylinder-specific characteristic toothing time.

In a further embodiment, all toothing times occurring within a working stroke of the selected cylinder are recorded and are associated with the relevant working stroke of the selected cylinder.

In a further embodiment, the cylinder-specific average value over the toothing times associated with the working stroke of the selected cylinder is determined based on toothing times that have been recorded during a working stroke of a preceding working cycle of the internal combustion engine.

In a further embodiment, any existing trend related to a variation of the toothing times, especially because of an increase or a reduction in the revolution rate of the crankshaft of the internal combustion engine, is taken into account during the determination of the cylinder-specific average value.

Another embodiment provides a method for the regulation of the smooth running of an internal combustion engine with a plurality of cylinders, the method comprising determining, for each cylinder of the internal combustion engine, the amount of energy released in the working stroke of said cylinder by a method as disclosed above, and adjusting at least one combustion-relevant parameter, so that the amounts of energy released in the different cylinders are at least approximately the same.

In a further embodiment, the at least one combustion-relevant parameter relates to a fuel supply path for the internal combustion engine.

Another embodiment provides a method for determining the cylinder pressure in different cylinders of an internal combustion engine with at least two cylinders, wherein one cylinder is a lead cylinder fitted with a cylinder pressure sensor and the at least one other cylinder is an auxiliary cylinder, the method comprising determining, for each cylinder of the internal combustion engine, a relative value for the amount of energy released in the working stroke of said cylinder by a method as disclosed above, measuring an absolute value for the cylinder pressure in the lead cylinder by means of the cylinder pressure sensor, determining a quantitative correlation between (a) the determined relative value for the amount of energy released in the working stroke of the lead cylinder and (b) the absolute value for the cylinder pressure in the lead cylinder, and calculating, for the at least one auxiliary cylinder of the internal combustion engine, the absolute value of the cylinder pressure in the at least one auxiliary cylinder based on (a) the determined quantitative correlation and (b) the determined relative value of the amount of energy released for the respective at least one auxiliary cylinder.

Another embodiment provides a method for checking the plausibility of a measurement signal of a cylinder pressure sensor of an internal combustion engine that comprises at least two cylinders, each fitted with a cylinder pressure sensor, the method comprising: determining, for each of the at least two cylinders of the internal combustion engine, a value for the amount of energy released in the working stroke of said cylinder by a method as disclosed above; measuring, for each of the at least two cylinders of the internal combustion engine, a value for the cylinder pressure in the respective cylinder by means of the respective cylinder pressure sensor; and determining, for each of the at least two cylinders of the internal combustion engine, a respective quantitative correlation between (a) the determined value for the amount of energy released in the working stroke of the respective cylinder and (b) the measured value for the cylinder pressure in the respective cylinder, and considering the at least two measured values for the respective cylinder pressure as correct measurement values if the at least two determined quantitative correlations are equal within a specified tolerance.

In a further embodiment, the method further comprises: considering at least one value for each cylinder pressure of the at least two measured values for the respective cylinder pressure as an incorrect measurement value if the at least two determined quantitative correlations differ from each other by more than the specified tolerance; and converting the at least one measurement value deemed to be incorrect into a modified measurement value for the cylinder pressure in each cylinder, so that a modified quantitative correlation between (i) the determined value for the amount of energy released in the working stroke of the respective cylinder and (ii) the modified measurement value is equal within the specified tolerance to at least one quantitative correlation between (i) a determined value for the amount of energy released in the working stroke of the respective cylinder and (ii) an associated measured value for the cylinder pressure in the respective cylinder, wherein the same relates to at least one quantitative correlation for a cylinder fitted with a cylinder pressure sensor whose measured values for the cylinder pressure are considered to be correct measurement values.

In a further embodiment, the method further comprises: operating the internal combustion engine in a stable operating state, in which all cylinders make an at least approximately equal torque contribution to the total torque of the internal combustion engine; measuring, in the stable operating state, for each of the at least two cylinders of the internal combustion engine, a value for the cylinder pressure in the respective cylinder by means of the respective cylinder pressure sensor; comparing the values measured in the stable operating state with each other; and if the values measured in the stable operating state deviate from each other by more than a further specified tolerance, adjusting a sensor characteristic of at least one cylinder pressure sensor such that, taking into account the at least one adjusted sensor characteristic, the associated measurement values for the cylinder pressure in the different cylinders are equal at least within the further specified tolerance.

Another embodiment provides a device for determining the amount of energy released in the working stroke of a cylinder of an internal combustion engine, the device comprising: a recording unit for recording a time profile of the revolution rate of the crankshaft of the internal combustion engine using toothing times, each representing a period of time within which two adjacent teeth of a sensor disk, which is connected to the crankshaft and which comprises an alternating arrangement of teeth and tooth spaces along its circumference, pass a reference position; and a data processing device for associating each of the toothing times with a respective working cycle of a selected cylinder of the internal combustion engine, for determining a cylinder-specific average value over the toothing times associated with the working cycle of the selected cylinder, for determining cylinder-specific toothing time deviations of each of the toothing times associated with the working stroke of the selected cylinder from the determined cylinder-specific average value, for determining a cylinder-specific characteristic toothing time by determining the geometric sum of the determined cylinder-specific toothing time deviations, and for determining the amount of energy released in the working stroke of the selected cylinder of the internal combustion engine depending on the determined cylinder-specific characteristic toothing time, wherein the amount of energy released is indirectly proportional to the determined cylinder-specific characteristic toothing time.

Another embodiment provides an engine controller for an internal combustion engine of a motor vehicle, the engine controller comprising a device as disclosed above for determining the amount of energy released in the working stroke of a cylinder of an internal combustion engine, wherein the engine controller is configured to carry out and/or to control at least one of the following methods: a method as disclosed above for determining the amount of energy released in the working stroke of a cylinder of an internal combustion engine, a method as disclosed above for regulating the smooth running of an internal combustion engine with a plurality of cylinders, a method as disclosed above for determining the cylinder pressure in different cylinders of an internal combustion engine with at least two cylinders, wherein one cylinder is a lead cylinder fitted with a cylinder pressure sensor and the at least one other cylinder is an auxiliary cylinder, and a method as disclosed above for checking the plausibility of a measurement signal of a cylinder pressure sensor of an internal combustion engine that comprises at least two cylinders, each fitted with a cylinder pressure sensor.

Another embodiment provides a computer program for determining the amount of energy released in the working stroke of a cylinder of an internal combustion engine, wherein the computer program is configured to carry out any of the methods disclosed above when executed by a processor.

BRIEF DESCRIPTION OF THE DRAWINGS

Example embodiments are discussed in detail below with reference to the drawings, in which.

DETAILED DESCRIPTION

Figure 1:
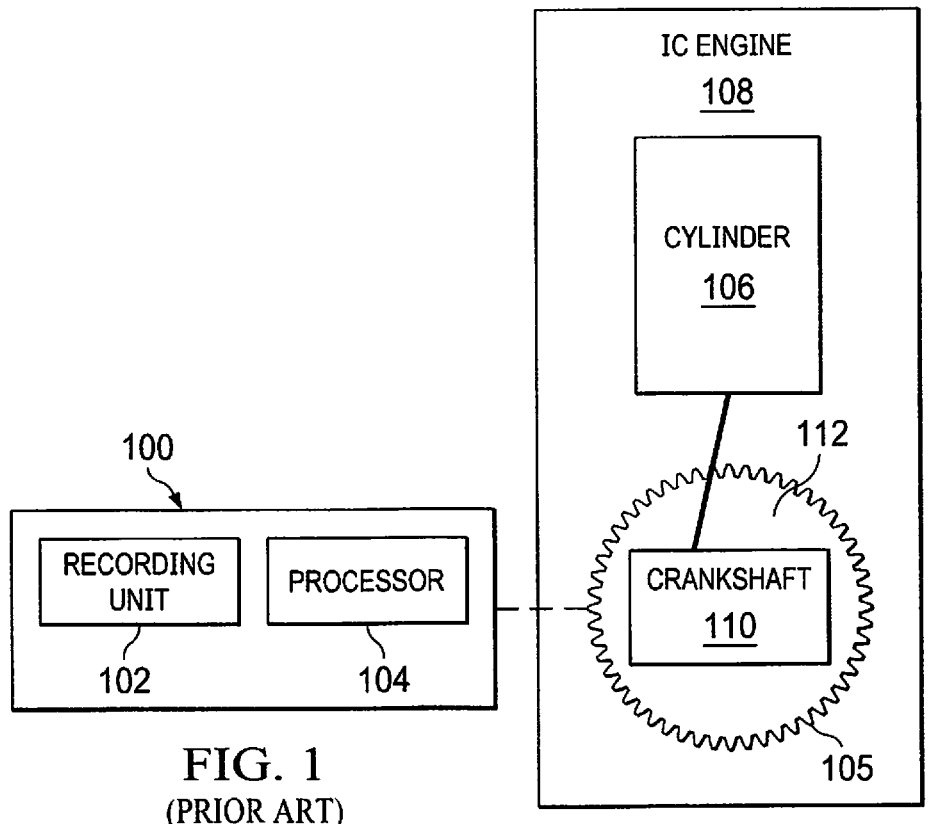
FIG. 1 shows a device for determining the amount of energy released in the working stroke of a cylinder of an internal combustion engine.

Embodiments of the invention determine the amount of energy released in the working stroke of an internal combustion engine very accurately and without a complex sensor system.

Of course, features and details that are disclosed in connection with one of the methods described herein also apply here in connection with the device, the engine controller and the computer program, and vice versa in each case, so that reference can always be alternatively made to the individual aspects of the invention in relation to the disclosure of this invention.

Some embodiments provide a method for determining the amount of energy released in the working stroke of a cylinder of an internal combustion engine. The method comprises (a) recording a time profile of the revolution rate of the crankshaft of the internal combustion engine using toothing times, each representing a period of time within which two adjacent teeth of a sensor disk, which is connected to the crankshaft and which comprises an alternating arrangement of teeth and tooth spaces along its circumference, pass a reference position, (b) associating the toothing times with a working stroke of a selected cylinder of the internal combustion engine in each case, (c) determining a cylinder-specific average value over the toothing times associated with the working stroke of the selected cylinder, (d) determining cylinder-specific toothing time deviations of each of the toothing times associated with the working stroke of the selected cylinder from the determined cylinder-specific average value, (e) determining a cylinder-specific characteristic toothing time by determining the geometric sum of the determined cylinder-specific toothing time deviations and (f) determining the amount of energy released in the working stroke of the selected cylinder of the internal combustion engine depending on the determined cylinder-specific characteristic toothing time, wherein the amount of energy released is indirectly proportional to the determined cylinder-specific characteristic toothing time.

The method described is based on the knowledge that the characteristic toothing time, which is given by the geometric (or Pythagorean) sum of each of the cylinder-specific toothing time deviations determined for a working stroke of the selected cylinder, is a direct measure of the amount of energy released in a working stroke of the selected cylinder.

This means that the toothing time defined here is equivalent to the respective amount of energy released. Hence an absolute value for the amount of energy released in the working stroke of the respective cylinder is not determined with the method described here, but only a relative value is determined. However, a proportionality factor between said relative value and the respective absolute amount of energy is the same for all cylinders, so that the relative values for different cylinders can be set in relation to each other and thereby important information about the operating state of the internal combustion engine and especially about the torque contributions of the individual cylinders can be obtained.

In comparison to known methods, the method described here has the advantage that only a geometric sum has to be calculated and that thus no mathematically rather complex Fourier analysis of the toothing times associated with each working stroke of a selected cylinder of the internal combustion engine has to be carried out. Furthermore, the method described here is suitable both for gasoline engines and also for diesel engines that are four-stroke internal combustion engines.

It is noted that the amount of energy released and thus also the characteristic toothing time is a direct measure or an equivalent of the torque that is generated in the relevant working stroke of the selected cylinder. In order to reduce any existing rough running of the internal combustion engine, based on the amounts of energy released for the different cylinders determined with the method described here, at least an approximate balancing of the cylinders can be achieved by adjusting combustion-relevant parameters cylinder-specifically for the individual cylinders, especially parameters describing the injection processes, so that as a result each cylinder makes a contribution to the total torque of the internal combustion engine that is as equal in magnitude as possible.

The sensor disk used for carrying out the method described can comprise an edge structure in a known manner, which comprises an alternating arrangement of a tooth and a tooth space in each case. A sensor associated with the sensor disk, which detects the presence and the absence of a tooth in the reference position, can produce a signal that can adopt at least two signal levels, wherein one of the signal levels is associated with a tooth and the other is associated with a tooth space. The signal or the different signal levels can be produced in any physical manner. In particular, the signal can be an electrical signal that is e.g. produced by a magnetic sensor (induction sensor), preferably a Hall sensor. However, other types of signal generation, e.g. optically by means of a light barrier, are also possible.

It is noted that in order to determine an absolute angular position of the crankshaft the sensor disk can comprise a reference marker that can be detected by a suitable sensor system, e.g. the above-mentioned magnetic sensor. In a known manner said marker can consist of e.g. two teeth being omitted from the otherwise regular arrangement of an alternating tooth and tooth space. Consequently, the sensor disk can e.g. comprise 60-2=58 teeth. In this connection it goes without saying that the toothing time that is associated with the omission of two teeth is either corrected in a suitable manner or is no longer taken into account for the subsequent process.

Expressed clearly, with the method described a revolution rate signal of an internal combustion engine can be analyzed so that the energy content or the amount of energy that is released in the working stroke of a cylinder of the internal combustion engine can be estimated in a mathematically particularly simple manner. A knowledge of said amount of energy can then be used to at least approximately achieve balancing of the individual cylinders of the internal combustion engine by cylinder-specific adjustment of injection parameters. The method described uses high resolution information about the toothing times sampled in a defined pattern over a specified observation time period and stored in a buffer, especially of an engine controller.

According to another embodiment, all toothing times occurring within a working stroke of the selected cylinder are recorded and associated with the relevant working stroke of the selected cylinder. This has the advantage that the time profile of the revolution rate of the crankshaft during the respective working stroke of the selected cylinder is recorded with the maximum possible accuracy. Hence the amount of energy released in the relevant working stroke of the selected cylinder can also be determined with particularly high accuracy.

Preferably, the toothing times are recorded with high time resolution, e.g. in the region of at least a few µs (1 µs=$10^{-6}$ seconds). The subsequent determinations or calculations of the cylinder-specific average value, the cylinder-specific toothing time deviations and the cylinder-specific characteristic toothing time preferably take place with the same time resolution. The result of this is also that the accuracy of the method described in relation to the determination of the amount of energy released is particularly high.

The term "working cycle" used below is to be understood in this document to mean the entirety of the four strokes of a four-stroke engine, which include as is well-known an induction stroke, a compression stroke, a working stroke and an exhaust stroke. During a working cycle the crankshaft of the internal combustion engine carries out two revolutions.

In the case of a sensor disk with 60 teeth there is thus a total of 120 transitions or toothing times between two adjacent teeth per working cycle of the (four-stroke) internal combustion engine. In the case of a four-cylinder engine there are thus 30 toothing times associated with each working stroke of a cylinder of the total of four cylinders. Consequently, optimal accuracy in the determination of the amount of energy released can be achieved if all 30 toothing times are taken into account for the determination of the amount of energy released in the relevant working stoke of the selected cylinder with the method described.

In this connection it is noted that at least with modern internal combustion engines accurate high time resolution information about the individual toothing times is already maintained in an engine controller. The method described can thus be implemented without equipment changes by the suitable programming of an engine controller of an internal combustion engine.

According to another embodiment, the cylinder-specific average value over the toothing times associated with the working stroke of the selected cylinder is determined on the basis of toothing times that have been determined during a working stroke of a preceding working cycle of the internal combustion engine. This means that some of the mathematical calculations carried out with the method described here have already been completed in advance in a preceding working cycle of the internal combustion engine. The requirement on a data processing device in which the mathematical calculations of the method described here are carried out can therefore be reduced. The method described can consequently be carried out with an engine controller of only medium computing power.

Preferably, the cylinder-specific average value is determined over those toothing times that were recorded in the working cycle that immediately precedes the current working cycle. In this way an unnecessarily long time period is avoided between the recording of the toothing times that are used exclusively for the cylinder-specific average value and the recording of those toothing times that are used (together with the toothing times that are also exclusively used for the cylinder-specific average value) for the determination of the cylinder-specific toothing time deviations. In this way a degradation of the accuracy as a result of the use of toothing times that are associated with different working cycles is reduced to a minimum.

According to another embodiment, during the determination of the cylinder-specific average value any prevailing trend relating to a variation of the toothing times, especially because of an increase or a reduction of the revolution rate of the crankshaft of the internal combustion engine, is taken into account. This has the advantage that even in the case of a systematic variation of the toothing times, e.g. because of an acceleration or a deceleration of a motor vehicle driven by the internal combustion engine, the cylinder-specific average value can already be determined in advance during a preceding working cycle without the fear of a degradation of the accuracy of the method described.

Other embodiments provide a method for the regulation of the smooth running of an internal combustion engine with a plurality of cylinders. Said method comprises (a) determining, for each cylinder of the internal combustion engine, the amount of energy released in the working stroke of said cylinder by means of a method of the above-mentioned type for determining the amount of energy released in the working stroke of a cylinder of an internal combustion engine, and (b) adjusting at least one combustion-relevant parameter so that the amounts of energy released in the different cylinders are at least approximately equal.

The method described is based on the idea that the fuel combustion in the individual cylinders can be adjusted based on a knowledge of the estimated cylinder-specific amounts of energy released in each working stroke, which are a direct measure of the torque contributions of the individual cylinders, so that all cylinders provide at least approximately the same torque contributions and thus maximum smooth running can be achieved.

Equalizing the individual torque contributions takes place by means of an adjustment of parameters that are relevant to the fuel combustion in each cylinder. Combustion-relevant parameters can relate to the air supply path for the internal combustion engine or preferably to the fuel supply path for the internal combustion engine.

A combustion-relevant parameter relating to the air supply path can e.g. be a charging pressure with which the air necessary for the combustion process is forced into the relevant cylinder of the internal combustion engine. Said charging pressure can be produced in a known manner, e.g. by a turbocharger. The combustion-relevant parameter can also be a rate of exhaust recycling that ensures in a known way that instead of pure air a mixture of air and exhaust gas from a previous combustion process of the cylinder involved is supplied. It is noted that the list of the combustion-relevant parameters relating to the air supply path described here is not conclusive.

According to one embodiment, the at least one combustion-relevant parameter relates to a fuel supply path for the internal combustion engine.

The at least one combustion-relevant parameter relating to the fuel supply path can e.g. be the start of a fuel injection, the injection pressure of the fuel, the injected quantity of fuel, the number of discrete injection processes (pre-injections) and/or the respective injection amounts in the case of the use of at least one pre-injection in addition to a main injection. The injection pressure can be measured and/or adjusted in a known manner in a fuel supply system, e.g. in a so-called common rail system. It is however noted that the list described here of combustion-relevant parameters is not conclusive.

The use of at least one of the combustion-relevant parameters described here relating to the fuel supply path has the advantage that the method described in this document can be implemented with conventional internal combustion engines and conventional fuel supply systems without this requiring a hardware technology conversion of the internal combustion engine and/or the fuel supply system.

Other embodiments provide a method for determining the cylinder pressure in different cylinders of an internal combustion engine with at least two cylinders, wherein one cylinder is a lead cylinder fitted with a cylinder pressure sensor and the at least one other cylinder is an auxiliary cylinder. This method comprises (a) determining, for each cylinder of the internal combustion engine, a relative value for the amount of energy released in the working stroke of said cylinder by means of a method of the above-mentioned type for determining the amount of energy released in the working stroke of a cylinder of an internal combustion engine, (b) measurement of an absolute value for the cylinder pressure in the lead cylinder by means of the cylinder pressure sensor, (c) determining a quantitative correlation between (c1) the determined relative value of the amount of energy released in the working stroke of the lead cylinder and (c2) the absolute value of the cylinder pressure in the lead cylinder, and (d) calculating, for the at least one auxiliary cylinder of the internal combustion engine, the absolute value of the cylinder pressure in the at least one auxiliary cylinder based on (d1) the determined quantitative correlation and (d2) the relative value determined for the amount of energy released for the at least one respective auxiliary cylinder.

The method described for determining the cylinder pressure is based on the idea that in a system with only one cylinder pressure sensor attached to a so-called lead cylinder the absolute cylinder pressures or cylinder pressure values in the auxiliary cylinders can be calculated by (a) forming a relationship between (a1) the absolute cylinder pressure measured with the cylinder pressure sensor and (a2) the with the above-mentioned method for determining the amount of energy released in the working cycle of a cylinder of an internal combustion engine and (b) by transferring the relationship formed to auxiliary cylinders, which are not fitted with a cylinder pressure sensor, e.g. for cost reasons.

Based on a knowledge of the absolute cylinder pressure values (during the working strokes) of all cylinders, the absolute or relative torque contributions of the individual cylinders can be determined in a known way. As already explained above, the amounts of energy released in the different cylinders can be adjusted by an adjustment of at least one combustion-relevant parameter so that the torque contributions of the individual cylinders to a total torque are at least approximately equal.

The internal combustion engine is then advantageously operated with maximum smooth running or with minimum rough running.

With the method described, simply speaking a dimensionless measure of the relative amount of energy of at least two cylinders is initially determined. Then for one of the two cylinders, which is designated as the lead cylinder, the absolute cylinder pressure is measured by means of a cylinder pressure sensor, which measures the pressure profile in the lead cylinder and outputs a corresponding cylinder pressure measurement signal. Said cylinder pressure measurement signal represents the torque contribution of the lead cylinder to the total torque of the internal combustion engine. A subsequently determined relationship, which is also referred to as a quantitative correlation and which can be defined by a simple proportionality factor, between the relative value of the amount of energy released and the measured cylinder pressure is then applied to the auxiliary cylinder. The absolute values of the cylinder pressure in the at least one auxiliary cylinder for this are calculated based on (a) said relationship and (b) the respective determined relative values for the respective released energy.

In this connection the term "cylinder pressure" can especially mean the so-called indicated mean pressure during the working stroke of the relevant cylinder. The term "cylinder pressure" can, however, also mean a pressure profile as a function of time or as a function of a crankshaft angle, the pressure profile arising during the working stroke of the cylinder involved.

With the method described for determining the (absolute) cylinder pressure in different cylinders of an internal combustion engine, a simple cylinder pressure sensor system with only one cylinder pressure sensor can be used with an estimate of the relative individual torques, which as described above are correlated with the respective amount of energy released, and based on a single absolute cylinder pressure determination, to calculate the absolute values of the torque contributions of all cylinders of the internal combustion engine. Full cylinder pressure regulation can be achieved with only a single cylinder pressure sensor by suitable cylinder-specific adjustments of combustion-relevant parameters and thus accurate control of the individual torque contributions can be achieved. For example, the manufacturing tolerances of fuel injectors can be compensated in this way in a simple manner. Furthermore, by analyzing the cylinder-specific differences regarding the toothing time or the torque contribution derived therefrom, impermissibly large deviations can be diagnosed. In the case of excessive differences between the different cylinders, a conclusion may then be drawn regarding an incorrect operating state of the internal combustion engine.

Expressed simply, based on a knowledge of the individual torque contributions, regulation of the individual torques can be carried out both with respect to their differences from each other (targeted balancing of the cylinders), which are to be avoided if possible, and also with respect to their absolute values. The resulting control interventions such as e.g. an adjustment of the injection, can be used for a diagnosis of the operating state of the internal combustion engine. This can e.g. take place by monitoring limit values for the required control interventions.

Furthermore, diagnostic functionality can advantageously be implemented with the described method, by means of which impermissibly large differences between the individual cylinders, e.g. with respect to the respective (i) toothing times, (ii) torques and/or (iii) values derived from the toothing times can be detected. If excessive differences are detected, then a conclusion can be drawn regarding an incorrect operating state of the internal combustion engine and e.g. a repair measure or maintenance work can be initiated.

Other embodiments provide a method for checking the plausibility of a measurement signal from a cylinder pressure sensor of an internal combustion engine comprising at least two cylinders, each cylinder being fitted with a cylinder pressure sensor. This method comprises (a) determining, for each of the least two cylinders of the internal combustion engine, a value for the amount of energy released in the working stroke of said cylinder by means of the above-mentioned method for determining the amount of energy released in the working stroke of a cylinder of an internal combustion engine, (b) measuring, for each of the at least two cylinders of the internal combustion engine, a value for the cylinder pressure in each of the cylinders by means of the respective cylinder pressure sensor, (c) determining, for each of the at least two cylinders of the internal combustion engine, a quantitative correlation between (c1) the determined value for the amount of energy released in the working stroke of the respective cylinder and (c2) the measured value for the cylinder pressure in the respective cylinder, and (d) regarding the at least two measured values for the respective cylinder pressure as correct measurement values if the at least two determined quantitative correlations are equal within a specified tolerance.

The method described for checking the plausibility of a measurement signal from a cylinder pressure sensor of an internal combustion engine is based on the idea that by a comparison of the quantitative correlations between (a) each estimated (relative) value for the amount of energy released in the working stroke of the respective cylinder and (b) each measured (relative or absolute) value for the cylinder pressure in the respective cylinder, it can be determined in a simple manner whether said quantitative correlations, which can each especially be a simple proportionality factor, are the same for all cylinders of the internal combustion engine within a specified deviation that is also seen as tolerable. If this is the case, then it can be assumed therefrom with high reliability that the entire cylinder pressure sensor system and especially all cylinder pressure sensors involved therein are working properly. If in the event of a comparison of the different determined quantitative correlations it should be revealed that at least one correlation deviates too much from the other correlation(s), then it can be assumed therefrom that at least one cylinder pressure sensor has a certain defect.

As already explained above, the term "cylinder pressure" can mean the indicated mean pressure during the working cycle of the cylinder involved. The term "cylinder pressure" can, however, also be a pressure profile as a function of time or as a function of a crankshaft angle, said pressure profile arising during the working stroke of the cylinder involved.

In some embodiments, the method further comprises (a) considering at least one value for the respective cylinder pressure of the at least two measured values for the respective cylinder pressure as an incorrect measurement value if the at least two determined quantitative correlations deviate from each other by more than the specified tolerance, and (b) converting the at least one measurement value that is considered to be incorrect into a modified measurement value for the cylinder pressure in the respective cylinder, so that (b1) a modified quantitative correlation between (i) the determined value for the amount of energy released in the working stroke of the respective cylinder and (ii) the modified measurement value is equal within the specified tolerance to (b2) at least one quantitative correlation between (i) a determined value for the amount of energy released in the working stroke of the respective cylinder and (ii) an associated measured value for the cylinder pressure in the respective cylinder, wherein the same relates to at least one quantitative correlation for a cylinder that is fitted with a cylinder pressure sensor, whose measured values for the cylinder pressure are considered to be correct measurement values. Thus in the case of a defective cylinder pressure sensor system a correction can be carried out for that cylinder pressure sensor or for those cylinder pressure sensors by adjusting e.g. a sensor characteristic in a suitable manner.

Expressed simply, the cylinder-specific torque contributions to a total torque of the internal combustion engine can be determined for an internal combustion engine that is fitted with a cylinder pressure sensor system comprising a plurality of cylinder pressure sensors by using the measured cylinder pressures. The different cylinders can be balanced with respect to their respective torque contributions by a cylinder-specific adjustment of combustion-relevant parameters. If, however, the cylinder pressure sensor system is defective, e.g. because of production errors and/or ageing effects, said defect can be identified with high reliability with the method described here for checking the plausibility of a measurement signal from a cylinder pressure sensor of an internal combustion engine, and may even be compensated by using a sensor characteristic modified in a suitable manner.

According to one embodiment, the method further comprises (a) operating the internal combustion engine in a stable operating state in which all cylinders provide an at least approximately equal torque contribution to the total torque of the internal combustion engine, (b) measuring, in the stable operating state, for each of the at least two cylinders of the internal combustion engine, a value for the cylinder pressure in the respective cylinder by means of the respective cylinder pressure sensor, (c) comparing the values measured in the stable operating state with each other, and (d) if the values measured in the stable operating state deviate from each other by more than another specified tolerance, adjusting a sensor characteristic of at least one cylinder pressure sensor such that by taking into account the at least one adjusted sensor characteristic the associated measurement values for the cylinder pressure in the different cylinders are equal at least within the further specified tolerance. This has the advantage that matching of the individual sensor characteristics can be carried out during the operation of the internal combustion engine. It is only necessary that the described stable operating state of the internal combustion engine exists at least for a relatively short time period. As a result, defects in the cylinder pressure measurement equipment can be diagnosed and compensated at the same time by a suitable adjustment of at least one sensor characteristic.

The stable operating state can e.g. be a deceleration phase of the internal combustion engine, during which no fuel injection takes place in any of the cylinders. A deceleration phase is typically particularly characterized by maximum smooth running. This is because there is no fuel combustion in a deceleration phase. Therefore there can be no differences in the amounts of energy released in the different cylinders. Therefore with correct sensor characteristics in such a stable operating state with little rough running all basically operational cylinder pressure sensors provide a similar measurement signal.

The adjustment of the sensor characteristic can e.g. consist of a change of a gradient or of a proportionality factor between the physical output signal of the cylinder pressure sensor involved and the respective cylinder pressure measurement signal indicating the actual cylinder pressure.

Alternatively or in combination, the adjustment of the sensor characteristic can also include the use of a new offset-value.

Other embodiments provide a device for determining the amount of energy released in the working cycle of a cylinder of an internal combustion engine. The described device comprises (a) a recording unit for recording a time profile of the revolution rate of the crankshaft of the internal combustion engine using toothing times, each of which is a period of time within which two adjacent teeth of a sensor disk, which is connected to the crankshaft and which comprises an alternating arrangement of teeth and tooth spaces along its circumference, pass a reference position, and (b) a data processing device (b1) for associating each of the toothing times with a working stroke of a selected cylinder of the internal combustion engine, (b2) for determining a cylinder-specific average value over the toothing times associated with the working stroke of the selected cylinder, (b3) for determining cylinder-specific toothing time deviations of the respective toothing times associated with the working stroke of the selected cylinder from the determined cylinder-specific average value, (b4) for determining a cylinder-specific characteristic toothing time by determining the geometric sum of the determined cylinder-specific toothing time deviations and (b5) for determining the amount of energy released in the working stroke of the selected cylinder of the internal combustion engine depending on the determined cylinder-specific characteristic toothing time, wherein the amount of energy released is indirectly proportional to the determined cylinder-specific characteristic toothing time.

The described device is also based on the idea that the characteristic toothing time, which is given by the geometric (or Pythagorean) sum of the respective cylinder-specific toothing time deviations determined for a working stroke of the selected cylinder, is a direct measure of the amount of energy released in a working stroke of the selected cylinder of the internal combustion engine. As already explained above, the characteristic toothing time defined here is a direct measure or an equivalent of the torque that is generated in the working stroke involved of the selected cylinder. Therefore, in order to reduce any rough running of the internal combustion engine, balancing of the cylinders can be at least approximately achieved by adjusting cylinder-specific combustion-relevant parameters based on the amounts of energy released.

Other embodiments provide an engine controller for an internal combustion engine of a motor vehicle. The described engine controller comprises a device of the above-mentioned type for determining the amount of energy released in the working stroke of a cylinder of an internal combustion engine. The engine controller described here is suitable for carrying out and/or for controlling at least one of the above-mentioned methods (a) for determining the amount of energy released in the working stroke of a cylinder of an internal combustion engine, (b) for regulating the smooth running of an internal combustion engine with a plurality of cylinders, (c) for determining the cylinder pressure in different cylinders of an internal combustion engine with at least two cylinders, wherein one cylinder is a lead cylinder fitted with a cylinder pressure sensor and the at least one other cylinder is an auxiliary cylinder, and (d) for checking the plausibility of a measurement signal of a cylinder pressure sensor of an internal combustion engine that comprises at least two cylinders, each of which is fitted with a cylinder pressure sensor.

The engine controller described is based on the idea that the above-described device can be implemented in an engine controller for an internal combustion engine of a motor vehicle and that in this way, e.g. by means of suitable software, the amount of energy released in the working stroke of a cylinder of an internal combustion engine can be determined in a simple manner.

In this connection it is noted that the engine controller described can also work in conjunction with other components of the internal combustion engine or of a motor vehicle in order to carry out some procedural steps of the method described here. The engine controller can thus work in conjunction e.g. with an induction sensor to record toothing times and/or with at least one cylinder pressure sensor to measure the cylinder pressure in the cylinder involved.

Other embodiments provide a computer program for determining the amount of energy released in the working stroke of a cylinder of an internal combustion engine. The computer program is configured to carry out the above-mentioned method when executed by a processor.

For the purposes of this document, the naming of such a computer program is synonymous with the concept of a program element, of a computer program product and/or of a computer-readable medium, which contains instructions for controlling a computer system for coordinating the operation of a system or of a method in a suitable manner to achieve the effects associated with the method according to the invention.

The computer program can be implemented as a computer-readable instruction code in any suitable programming language such as e.g. in JAVA, C++ etc. The computer program can be stored on a computer-readable storage medium (CD-ROM, DVD, Blueray disk, removable drive, volatile or non-volatile memory, built-in memory or processor etc.). The instruction code can program a computer or other programmable device, such as especially a controller for an internal combustion engine of a motor vehicle, such that the desired functions are carried out. Furthermore, the computer program can be provided in a network such as e.g. the Internet, from which it can be downloaded when required by a user.

Embodiments of the invention can be implemented both by means of a computer program, i.e., by means of software, and also by means of one or more special electrical circuits, i.e. in hardware or even in any hybrid form, i.e. by means of software components and hardware components.

Further advantages and features of the present invention are revealed in the following exemplary description of currently preferred embodiments.

It is noted that the embodiments described below only represent a limited selection of possible embodiment versions of the invention. In particular, it is possible to combine the features of individual embodiments with each other in a suitable manner so that with the embodiment versions explicitly illustrated here a number of different embodiments can be viewed as being publicly disclosed for the person skilled in the art.

FIG. 1 shows a device 100 for determining the amount of energy released in the working stroke of a cylinder 106 of an internal combustion engine 108. The device 100 or some components of the device 100 can be implemented in an engine controller for a motor vehicle. The device 100 comprises a recording unit 102 for recording a time profile of the revolution rate of the crankshaft 110 of the internal combustion engine 108 using toothing times, each of which represents a period of time within which two adjacent teeth of a sensor disk 105, which is connected to the crankshaft 110 and which comprises and alternating arrangement of teeth and tooth spaces along its circumference, pass a reference position. The device further comprises a data processing device 104. The data processing device 104 is configured or programmed (a) to associate the toothing times with a respective working cycle of a selected cylinder 106 of the internal combustion engine 108, (b) for determining a cylinder-specific average value over the toothing times associated with the working stroke of the selected cylinder 106, (c) to determine cylinder-specific toothing time deviations of each toothing time associated with the respective working stroke of the selected cylinder 106 from the determined cylinder-specific average value, (d) for determining a cylinder-specific characteristic toothing time by determining the geometric sum of the determined cylinder-specific toothing time deviations and (e) for determining the amount of energy released in the working stroke of the selected cylinder 106 of the internal combustion engine 108 depending on the determined cylinder-specific characteristic toothing time, wherein the amount of energy released is indirectly proportional to the determined cylinder-specific characteristic toothing time.

Figure 2:
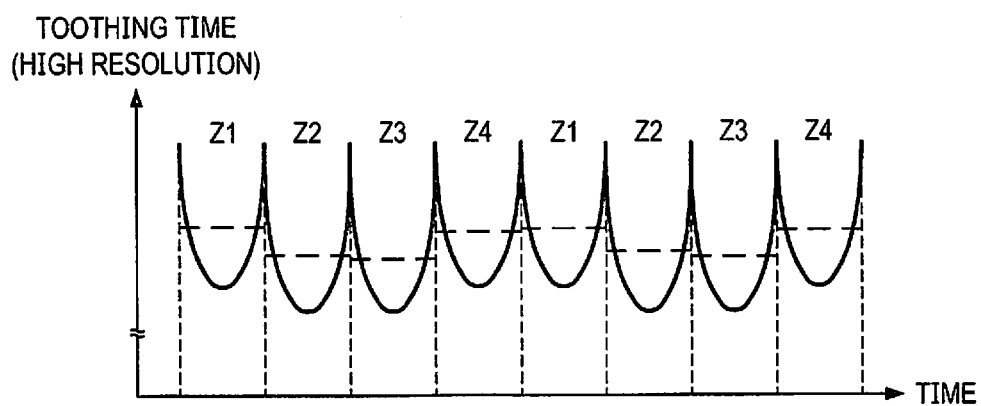
FIG. 2 shows a diagram in which the time profile of high resolution measured toothing times of a sensor disk coupled to a crankshaft of a four-cylinder four-stroke engine are plotted.

FIG. 2 shows a diagram in which the time profile of high resolution measured toothing times of a sensor disk coupled to a crankshaft of a four-cylinder four-stroke engine is plotted. The toothing time here is the period of time within which two adjacent teeth of a sensor disk, which is coupled to the crankshaft of the internal combustion engine involved and which comprises an alternating arrangement of teeth and tooth spaces along its circumference, pass a reference position. The toothing time, which can be determined in a known manner, e.g. by means of a magnetic sensor, consequently represents the current rate of rotation or revolution rate of the crankshaft with high time resolution. A long toothing time corresponds to a low rate of rotation, a short toothing time corresponds to a high rate of rotation.

From the illustrated time profile of the toothing times an association with the working strokes of the individual cylinders of the internal combustion engine can be carried out in a simple manner. Here the fact can be used that in the cylinder of the four-cylinder internal combustion engine that is just in the working stroke the crankshaft accelerates at the start of the working stroke starting from a relatively low rate of rotation. After a maximum rate of rotation has been achieved within said working stroke, the rate of rotation decreases slightly again before the next cylinder enters its working stroke and in a similar manner initially provides an increase of the rate of rotation therein, and again provides a reduction of the rate of rotation after exceeding a maximum.

Because the rate of rotation is indirectly proportional to the toothing time, a characteristic shape results in the diagram of FIG. 2 for each working stroke of a cylinder, the shape being similar to the shape of a parabola that is open at the top and which is bounded in the horizontal direction by two dashed vertical lines, one on the left side and one on the right side.

The profile illustrated in FIG. 2 results in the case of a four-cylinder internal combustion engine. For this reason the illustrated profile also comprises a periodicity of four such characteristic shapes. In FIG. 2 each of said characteristic shapes is associated with a cylinder Z1, Z2, Z3 or Z4 of the four-cylinder internal combustion engine.

The horizontal dashed lines indicate the average value of the toothing times arising within the respective working stroke of the cylinder involved.

Figure 3:
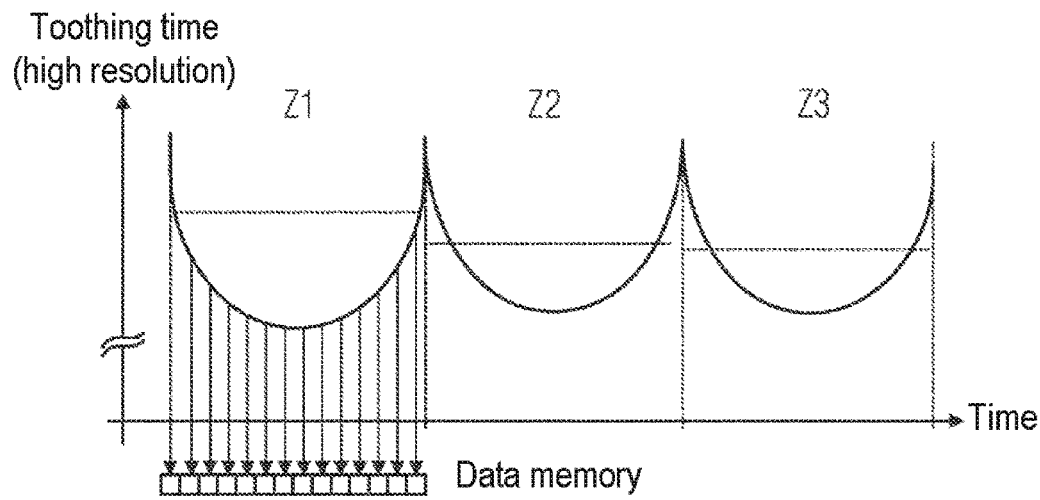
FIG. 3 shows an enlarged illustrated segment of the diagram shown in FIG. 2.

FIG. 3 shows a segment of the diagram shown in FIG. 2 in an enlarged illustration. In the case of the exemplary embodiment described here, the high resolution toothing time is sampled over a certain observation time period of e.g. two working cycles of the internal combustion engine involved with a defined pattern and is stored in a buffer or a data memory, especially a data memory of an engine controller. In the data memory e.g. 30 toothing times per working cycle of the cylinder involved can be stored.

In contrast to previously known methods, the contents of the data memory in the case of the method described here are not subjected to a complex frequency analysis. Only the average value over the different toothing times is calculated and subtracted from each individual toothing time. Then the geometric sum is formed over the toothing times corrected in this way by the average value. The next equation describes said procedure in a mathematical way:

$$ZZ_{char} = \sqrt{\sum_{i=1}^{N} ZZ_i^2}$$

$ZZ_i$ stands for the toothing time in the data memory at position i corrected by the average value. N is the number of toothing times or elements in the data memory. The data memory is a temporary toothing time memory. The expression $ZZ_{char}$ is the so-called characteristic toothing time, which represents an equivalent to the amount of energy that is released in the respective working stroke of the cylinder involved.

According to a version of the invention that is not explained in detail here, prior to forming the geometric sum a constant component (e.g. from the last cycle or working cycle) or any toothing time trend (in the case of a potentially present slight acceleration or deceleration of the crankshaft) can also be removed.

The characteristic toothing time $ZZ_{char}$ defined here represents an equivalent (indirect proportionality) of the torque contribution to the total torque that is provided by the cylinder involved with each working stroke. By using an equality function with a suitable change of the injection parameter (and thus of the respective torque contribution), the torque contributions of the individual cylinders can be brought into agreement, so that as a result the smooth running of the internal combustion engine is improved considerably.

In the case of the method described here, a complex FFT analysis can be dispensed with by removing the average value in the toothing time buffering and forming the sum.

Figure 4:
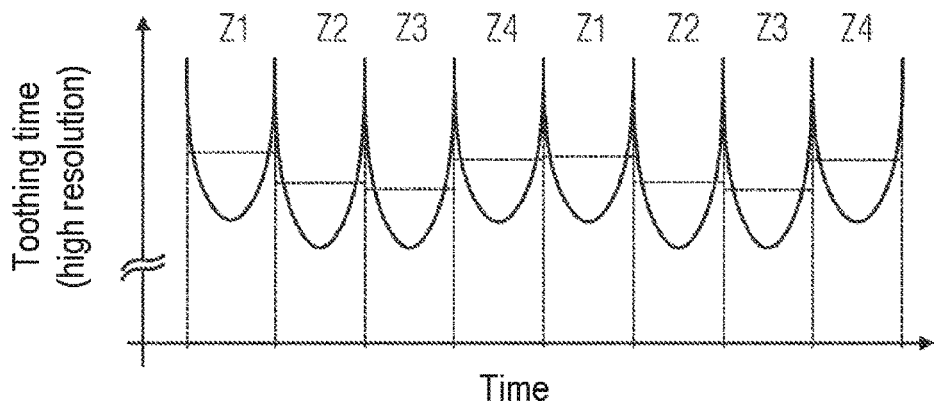
FIG. 4 shows how an absolute calculation of the individual cylinder pressures can be carried out for an internal combustion engine in which only one cylinder is fitted with a cylinder pressure sensor by forming relationships of the amounts of energy released from the individual cylinders.
Figure 4:
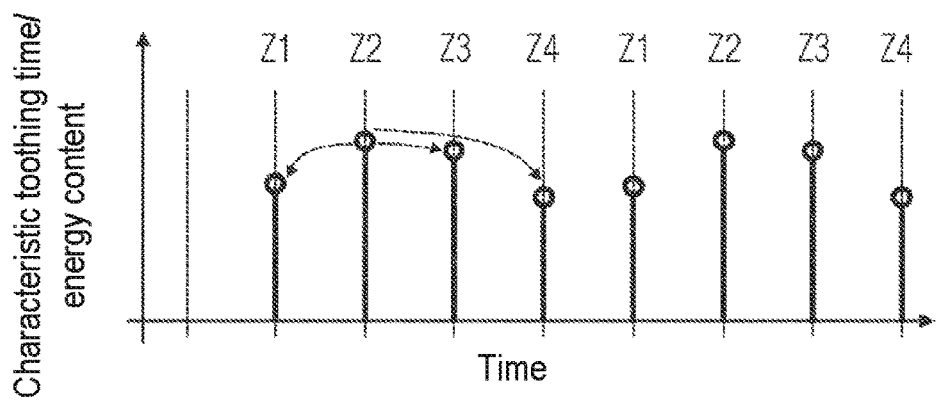

FIG. 4 shows how an absolute calculation of the individual cylinder pressures can be carried out in the case of an internal combustion engine in which only one cylinder is fitted with a cylinder pressure sensor by forming relationships of the amounts of energy released by the individual cylinders. The upper diagram of FIG. 4 is identical to the diagram of FIG. 2. In the lower diagram of FIG. 4 the respective characteristic toothing times are shown for each working stroke of one of the cylinders of the internal combustion engine involved, which, as explained above, represent an indirectly proportional equivalent to the amount of energy released in each working stroke.

Because only the average value over the toothing times involved has to be formed prior to the calculation of a characteristic toothing time, the characteristic toothing times are shifted slightly to the right in comparison to the minima of the above-mentioned characteristic shapes at the end of each working stroke.

In the case of the exemplary embodiment described here, the second cylinder Z2 is the so-called lead cylinder. The other cylinders Z1, Z3 and Z4 are so-called auxiliary cylinders. This means that only said lead cylinder is fitted with a cylinder pressure sensor, e.g. for cost reasons. Therefore also only the torque contribution of said lead cylinder can be directly determined using the measurement data provided by the cylinder pressure sensor.

However, the individual amounts of energy that are released in the working strokes of the different cylinders, and that are illustrated by circles in FIG. 4, can be related to each other. The corresponding relationships between the lead cylinder Z2 on the one hand and the other cylinders Z1, Z3 and Z4 on the other hand are illustrated in FIG. 4 by the curved arrows that are shown in dashed form.

In order to indirectly determine the cylinder pressures in the cylinders Z1, Z3 and Z4, it is assumed that the amounts of energy released and the respective associated cylinder pressures for all cylinders are in the same ratio to each other. Expressed simply, in a system with only one cylinder pressure sensor a calculation of the individual cylinder torques is carried out by forming the relationships of the amounts of energy released in the individual cylinders with each other (e.g. by a ratio equation).

Based on said information, e.g. regulation of the relative cylinder torques in respect of minimizing the differences between the individual cylinder torques (balancing) can then be carried out. Moreover, the absolute values of the cylinder pressures of the other cylinders can also be regulated to specified target values based on the knowledge of the absolute cylinder pressure in the lead cylinder. The control interventions resulting therefrom can also be used for a diagnosis of the operation (state) of the internal combustion engine, e.g. by adjusting the parameters for fuel injection. This can e.g. be carried out by monitoring limits for the control interventions for a defined time period. Furthermore, diagnostic functionality can be provided that can detect differences of the individual cylinders (e.g. toothing times, torque or values derived from the toothing times) and can reliably identify impermissibly high deviations.

The method described here has the following advantages among others:

(A) The cylinder pressures in all cylinders can also be determined with high accuracy if only one (lead) cylinder is fitted with a cylinder pressure sensor. Because of this the complete provision of suitable cylinder pressure measurement equipment for each cylinder can be omitted.

(B) The regulation of cylinder pressure enables more accurate control of the torque contributions of the individual cylinders. Because of this, the manufacturing tolerances can be compensated in a simple and effective manner, e.g. in the case of the fuel injectors used.

(C) Impermissibly high deviations can be diagnosed by suitable analysis of the cylinder differences with respect to the characteristic toothing time or with respect to the torque contributions derived therefrom. In this way a repair of the internal combustion engine can be effected in many cases at the correct time, i.e. before any further damage to the internal combustion engine occurs.

(D) A variable describing the deviation of the individual cylinders from each other, such as especially the characteristic toothing time, can be used as an input for regulation that acts upon a suitable final control element (e.g. the injection). As a result, especially rough running of the internal combustion engine can be minimized.

It is noted that instead of the second cylinder Z2 of course any other cylinder can also be the lead cylinder fitted with the cylinder pressure sensor.

Figure 5:
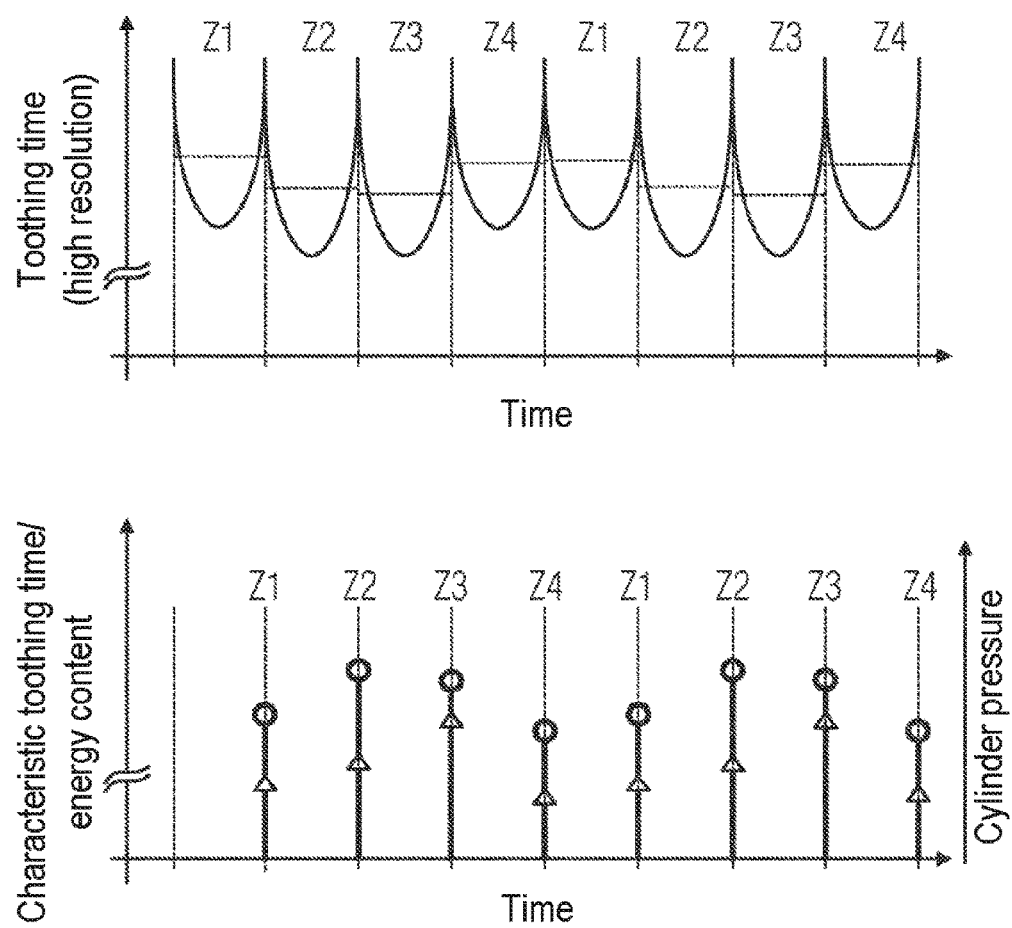
FIG. 5 shows a plausibility check of a plurality of measurement signals of each cylinder pressure sensor using a comparison with an estimate of a respective amount of energy released in a working stroke of a based on an analysis of measured toothing times.

FIG. 5 shows a plausibility check of a plurality of measurement signals of each cylinder pressure sensor using a comparison with an estimate of a respective amount of energy released in a working stroke based on an analysis of measured toothing times. In contrast to FIG. 4, in the lower diagram of FIG. 5 the dashed arrows are no longer present. Moreover, the associated cylinder pressure that occurs during the respective working stroke in the respective cylinder is plotted on an additional right ordinate. The cylinder pressures that have each been measured with a cylinder-specific cylinder pressure sensor are each shown by a triangle.

As is apparent from FIG. 5, in the selected arbitrary scaling of the two ordinates for the cylinders Z1, Z2 and Z4 the triangles are each located at about half the height of the circles. Only in the case of cylinder Z3 is the triangle noticeably higher than half the height of the corresponding circle. On condition that the determination of the characteristic toothing times or the amounts of energy released is not incorrect, it can be assumed therefrom that the cylinder pressure sensor of cylinder Z3, or an analyzer connected downstream of said cylinder pressure sensor for the measurement signal of the cylinder pressure sensor, is defective. It may be that the error in the cylinder pressure measurement signal for the second cylinder can be compensated by an adjustment of a corresponding sensor characteristic.

Figure 6:
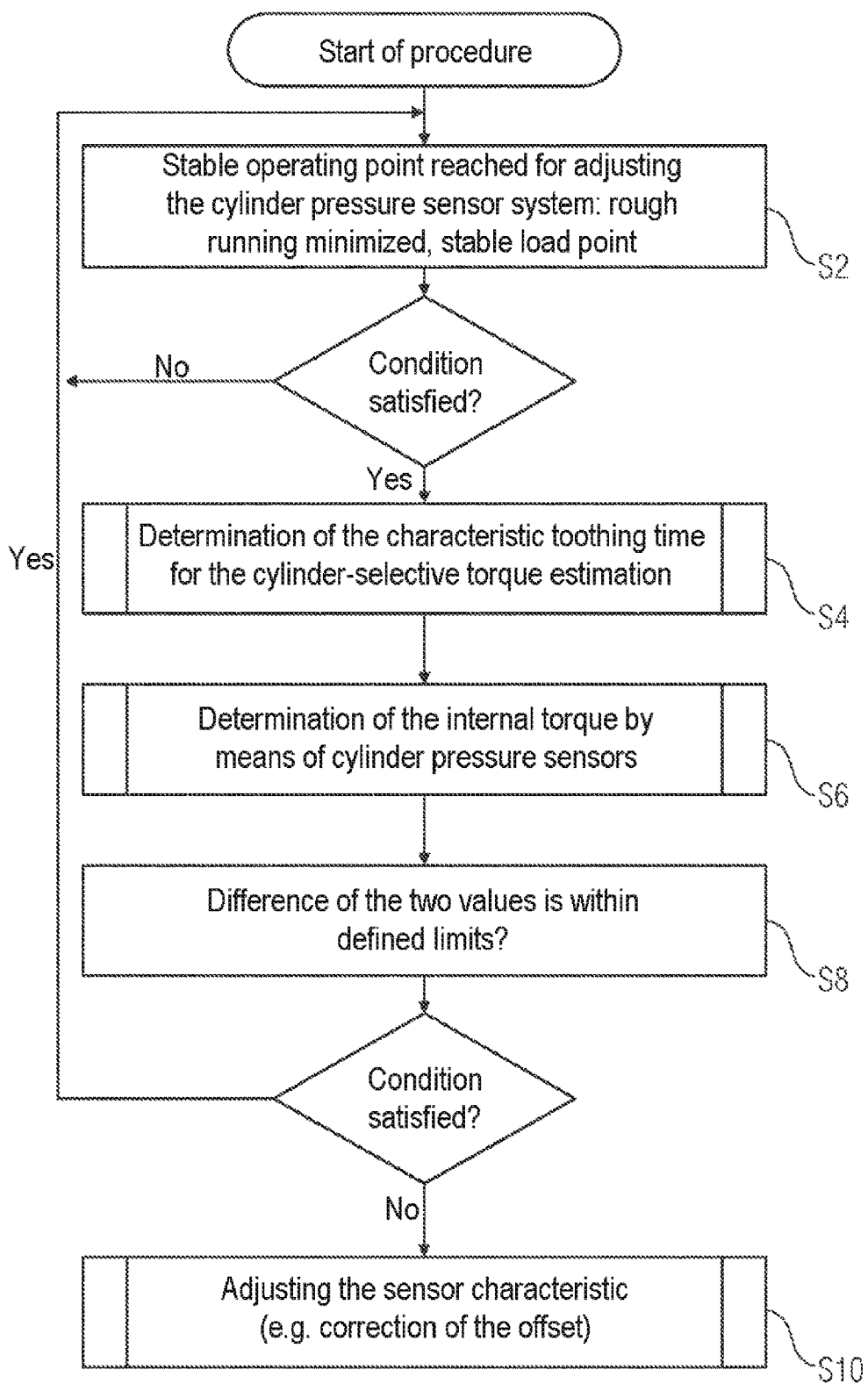
FIG. 6 shows a possible procedure for a method of adjusting a sensor characteristic of a cylinder pressure sensor based on a cylinder-selective comparison between (a) an estimated value for the amount of energy released in the working cycle of the cylinder involved and (b) a measurement value for the cylinder pressure in the cylinder involved detected by a cylinder pressure sensor.

FIG. 6 shows a possible procedure for a method for adjusting a sensor characteristic of a cylinder pressure sensor based on a cylinder-selective comparison between (a) an estimated value for the amount of energy released in the working stroke of the cylinder involved and (b) a measurement value for the cylinder pressure in the cylinder involved detected by a cylinder pressure sensor.

In the case of the method described here, a check is initially made in a step S2 as to whether a stable operating point or load point exists for the internal combustion engine. Such a stable operating point or load point e.g. exists if the fuel-injected amounts have small fluctuations from working cycle to working cycle (the injected mass is slightly dynamic) and/or if the ambient conditions, such as e.g. the engine temperature of the internal combustion engine, which can especially be indicated by the oil temperature, lies within determined limits. If a stable operating point or load point does not exist, then the procedure is to wait until such a stable operating point or load point occurs at a later point in time. If no stable operating point or load point exists then the characteristic toothing time or the amount of energy released is determined for the cylinder involved in a step S4 as explained above. Then the internal torque is determined for the cylinder involved in a step S6 by means of the cylinder pressure sensor mounted on the cylinder. In a subsequent step S8 a check is made as to whether (a) the result of the estimation for the cylinder-specific torque contribution based on the analysis of the toothing times involved and (b) the measurement results for the torque contribution provided by the cylinder pressure measurement equipment are the same within predefined limits. If this is the case, then there is no error. If not, then there is a suspected error, which can optionally be verified (not shown in FIG. 6) at another stable operating point or load point of the internal combustion engine. According to the exemplary embodiment illustrated here, in the case of an error a sensor characteristic can be adjusted in a step S10, e.g. by a change of a gradient or of a proportionality factor between the physical output signal of the cylinder pressure sensor involved and the respective cylinder pressure measurement signal indicating the actual cylinder pressure and/or by the use of a new offset value. Using said adjusted sensor characteristic, the cylinder pressure sensor involved can then be used again for an engine controller in the usual manner.

The method described here has the advantage that calibration of the cylinder pressure sensor system can be carried out during the operation of an internal combustion engine. It is only necessary that the internal combustion engine is operated at least for a short time at a stable operating point or load point. Moreover, with the method described defects in the cylinder pressure measurement equipment can be reliably detected and potentially also diagnosed.

What is claimed is:

1. A method for checking the plausibility of a measurement signal of a cylinder pressure sensor of an internal combustion engine that comprises at least two cylinders each fitted with a cylinder pressure sensor, the method comprising:
    recording a time profile of a revolution rate of a crankshaft of the internal combustion engine using toothing times, each toothing time representing a period of time within which two adjacent teeth of a sensor disk pass a reference position, the sensor disk being connected to the crankshaft and comprising an alternating arrangement of teeth and tooth spaces along a circumference of the sensor disk,
    associating the toothing times with a respective working cycle of a selected cylinder of the internal combustion engine,
    determining a cylinder-specific average value over the toothing times associated with the working cycle of the selected cylinder,
    determining cylinder-specific toothing time deviations of the toothing times associated with each working stroke of the selected cylinder from the determined cylinder-specific average value,
    determining a cylinder-specific characteristic toothing time by determining the geometric sum of the determined cylinder-specific toothing time deviations,
    determining an amount of energy released in the working stroke of the selected cylinder of the internal combustion engine depending on the determined cylinder-specific characteristic toothing time, wherein the amount of energy released is indirectly proportional to the determined cylinder-specific characteristic toothing time,
    measuring, for each of the at least two cylinders of the internal combustion engine, a value for the cylinder pressure in the respective cylinder using the respective cylinder pressure sensor,
    determining, for each of the at least two cylinders of the internal combustion engine, a respective quantitative correlation between:
        (a) the determined value for the amount of energy released in the working stroke of the respective cylinder, and
        (b) the measured value for the cylinder pressure in the respective cylinder, and
    using the at least two measured values for the respective cylinder pressure as correct measurement values if the at least two determined quantitative correlations are equal within a specified tolerance,
    operating the internal combustion engine in a stable operating state, in which all cylinders make an at least approximately equal torque contribution to the total torque of the internal combustion engine,
    measuring, in the stable operating state, for each of the at least two cylinders of the internal combustion engine, a value for the cylinder pressure in the respective cylinder using the respective cylinder pressure sensor,
    comparing the values measured in the stable operating state with each other, and
    if the values measured in the stable operating state deviate from each other by more than a further specified tolerance, adjusting a sensor characteristic of at least one cylinder pressure sensor such that, taking into account the at least one adjusted sensor characteristic, the associated measurement values for the cylinder pressure in the different cylinders are equal at least within the further specified tolerance.

2. The method of claim 1, further comprising:
    considering at least one value for each cylinder pressure of the at least two measured values for the respective cylinder pressure as an incorrect measurement value if the at least two determined quantitative correlations differ from each other by more than the specified tolerance, and
    converting the at least one measurement value deemed to be incorrect into a modified measurement value for the cylinder pressure in each cylinder, so that
        a modified quantitative correlation between
            (i) the determined value for the amount of energy released in the working stroke of the respective cylinder, and
            (ii) the modified measurement value is equal within the specified tolerance to at least one quantitative correlation between
            (i) a determined value for the amount of energy released in the working stroke of the respective cylinder, and
            (ii) an associated measured value for the cylinder pressure in the respective cylinder, wherein the same relates to at least one quantitative correlation for a cylinder fitted with a cylinder pressure sensor whose measured values for the cylinder pressure are considered to be correct measurement values.

* * * * *